United States Patent
Juguin et al.

[15] 3,696,167
[45] Oct. 3, 1972

[54] CATALYST AND PROCESS FOR DEHYDROGENATING SATURATED HYDROCARBONS

[72] Inventors: Bernard Juguin, 46, avenue du Stade; Jean Francois Le Page, 6, rue Henri Dunant, both of 92 Rueil Malmaison; Jean Miquel, 5, rue Fragonard, Paris XVIIeme, all of France

[22] Filed: March 30, 1970

[21] Appl. No.: 23,991

[30] Foreign Application Priority Data

April 4, 1969   France......................6910608

[52] U.S. Cl........260/683.3, 260/680 R, 252/466 PT
[51] Int. Cl..............................C07c 5/18, B01j 11/12
[58] Field of Search ...252/466 PT, 466 B; 260/683.3

[56] References Cited

UNITED STATES PATENTS

| | | | |
|---|---|---|---|
| 3,291,855 | 12/1966 | Haensel | 260/683.3 |
| 2,802,794 | 8/1957 | Sprauer | 252/466 PT |
| 2,848,377 | 8/1958 | Webb | 252/466 PT |
| 2,854,404 | 9/1958 | Prater et al. | 252/466 PT |
| 2,911,357 | 11/1959 | Myers et al. | 252/466 B |
| 3,055,840 | 9/1962 | Koch | 252/466 PT |
| 3,126,426 | 3/1964 | Turnquest et al. | 252/466 PT |
| 3,210,296 | 10/1965 | Gray | 252/466 PT |
| 3,507,781 | 4/1970 | Spurlock et al. | 252/466 PT |

*Primary Examiner*—Daniel E. Wyman
*Assistant Examiner*—W. J. Shine
*Attorney*—Millen, Raptes & White

[57] ABSTRACT

For dehydrogenating saturated hydrocarbons, there is provided a substantially neutral catalyst containing (a) alumina, (b) from 0.05 to 2 percent by weight of platinum, (c) from 0.01 to 0.5 percent by weight of at least one additional noble metal from the group consisting of iridium and ruthenium, the latter percentages being given with respect to alumina, wherein the content by weight of the additional noble metal is from 0.05 to 0.3 times the content by weight of platinum and (d) an alkali or alkaline-earth metal with a content by weight of from 0.3 to 10 times the overall content of noble metals, the specific surface of the catalyst being 1 to 20 sq. m. per gram and the neutralization heat of the alumina being below 5 calories per gram in the ammonia adsorption test. Of the above catalysts, the best are produced by introducing the alkali or alkaline-earth metal compound after the noble metals are introduced.

20 Claims, No Drawings

CATALYST AND PROCESS FOR DEHYDROGENATING SATURATED HYDROCARBONS

This invention relates to a catalyst and a process for dehydrogenating saturated hydrocarbons in the presence of said catalyst. It further relates to an improved process for dehydrogenating saturated hydrocarbons containing from four to 40 carbon atoms per molecule, to the corresponding unsaturated hydrocarbons having the same number of carbon atoms.

The manufacture of unsaturated hydrocarbons by dehydrogenating saturated hydrocarbons in the presence of a catalyst is a well-known process. A great number of processes and catalysts are known to promote the dehydrogenation of n-paraffins to the corresponding olefins. A typical example is the dehydrogenation of n-butane to butenes in the presence of a catalyst consisting of chromium oxide on alumina. Other known catalysts comprise such noble metals as platinum and palladium on such carriers as alumina, silica or mixtures thereof.

It has been observed that the use of such catalysts results in large deposits of carbon or coke, thus in a rapid deactivation of the catalytic activity. These catalysts also result in undesired secondary reactions, such as cracking, aromatization, isomerization and production of poly-unsaturated hydrocarbons, for example dienes and trienes. Since the desired product is usually a mono-ethylenic hydrocarbon, these secondary reactions reduce the efficiency of the known processes, making them unattractive from the economic point of view.

The main objects of this invention are:

a catalyst and a process for dehydrogenating saturated hydrocarbons with a minimum of undesired secondary reactions such as cracking, aromatization and isomerization.

a catalyst and a process for dehydrogenating saturated hydrocarbons, to mono-ethylenic hydrocarbons with a minimum of conversion to poly-ethylenic hydrocarbons.

a catalyst and a process according to which saturated hydrocarbons may be dehydrogenated with a minimum of coke deposits and a high catalytic activity over an extended period.

A main object of this invention is dehydrogenating straight-chain paraffinic hydrocarbons.

The products resulting from dehydrogenating straight-chain hydrocarbons are raw materials for manufacturing detergents of the sulfonate or alkylaromatic sulfate type which are bio-degradable.

Another main object of this invention is separating the dehydrogenation products and then transforming them to long-chain alcohols by OXO synthesis.

These objects are attained according to this invention by using a catalyst containing alumina and from 0.05 to 2 percent by weight of platinum, from 0.01 to 0.5 percent by weight of iridium and/or ruthenium, with respect to alumina, and an alkali or alkaline earth metal in an amount of 0.3 to 10 times the total amount of noble metals.

It has been discovered that the conjoint use of platinum and iridium or ruthenium, strongly increases the dispersion of the dehydrogenating elements on the carrier surface, which increases the catalyst activity and, before all the life of the catalyst by avoiding a quick recrystallization of these metals. The stability is increased further when both platinum, iridium and ruthenium are used, the latter two metals being in a ratio by weight of 0.1 to 10:1 and preferably from 0.5 to 2:1.

The results obtained according to this invention are unexpected since the catalysts which contain either one single noble metal or several noble metals other than those claimed herein exhibit both a low selectivity and a poor stability when used for dehydrogenating straight-chain saturated hydrocarbons.

The content of platinum is from 0.05 to 2 percent and preferably from 0.15 to 0.7 percent by weight with respect to alumina.

The content of iridium and/or ruthenium may range from 0.05 to 2 times, preferably from 0.1 to 0.6 times and advantageously from 0.15 to 0.3 times the content by weight of platinum. Below these limits, iridium and ruthenium do not improve significantly the catalyst, and beyond these limits, the selectivity of the catalyst drops abruptly.

The alumina carriers are not equivalent, and it has been shown that the best catalysts are manufactured from a non-acidic or substantially neutral alumina carrier whereupon the dehydrogenating elements (platinum and ruthenium and/or iridium) may be deposited. Consequently, since the major portion, by far, of the catalyst is alumina, the best catalysts as a whole are substantially neutral.

The acidity may be determined by the known ammonia adsorption test: the absence of acidity results in no heat release.

The alumina and the final catalyst may have a specific surface in the preferred range of 1 to 100 sq. m. per gram, more preferably 1 to 20 sq.m. per gram.

The pore volume will preferably range between 0.4 and 0.8 ccm per gram; from 70 to 90 percent of this pore volume advantageously consist of pores with an average diameter between 1,000 and 4,000 angstroms.

Alumina balls will be preferred among the carriers conforming to these specifications, although other shapes may be used, for example extrudates or pellets conforming to the above conditions.

The preferred carriers are non-acidic or substantially neutral. The best selectivities have been obtained with alpha alumina whose neutralization heat by ammonia adsorption is lower than 5 calories per gram, and preferably lower than 1.5 calories per gram, or whenever possible, null. Other aluminas may be used, for example gamma-alumina or eta-alumina; however since they exhibit acid properties, they induce parasitic reactions of cracking, aromatization and isomerization, which make their use less desirable.

Platinum and iridium and/or ruthenium may be introduced simultaneously onto the carrier by means of solutions containing these metals, for example aqueous solutions of platinum chloride, iridium chloride and ruthenium chloride, hexachloroplatinic acid, hexachloroiridic acid, hexachlororuthenic acid, ammonium, sodium or potassium hexachloroplatinate, hexachloroiridate or hexachlororuthenate, platinum, iridium or ruthenium diaminodinitrite, acetylacetonate or citrate. When the metals are introduced separately, the results are not so good, although sufficient.

These solutions of platinum and the other two metals are usually acid; it is then preferred to neutralize this excess of acidity by incorporating to the catalyst compounds having a basic reaction or able to decompose to basic compounds during the manufacture or the use of the catalyst, in order to have a good selectivity.

The hydroxoides of alkali or alkaline-earth metals and the carbonates or other salts of weak acids of the same metals are examples of such compounds. The content by weight of alkali or alkaline-earth metal compound, expressed as alkali or alkaline-earth metal, is usually from 0.3 to 10 times the total content of noble metals, and preferably from 2 to 4 times this content. It must be pointed out that the alkali or alkaline-earth metal compound is preferably introduced after the noble metals.

By way of specific examples of such compounds, the following may be mentioned: potassium carbonate, sodium carbonate, barium carbonate, magnesium carbonate, calcium acetate, lithium carbonate, strontium acetate, sodium citrate and calcium oxalate.

After the basic compounds have been introduced the catalyst may be heated up to temperatures of from 300° to 750°C in order to improve the neutralization by said compounds: the efficiency and the selectivity of the catalyst are better.

When the solutions containing platinum and iridium and/or ruthenium also contain chlorine (for example chlorides of these metals, hexachloroplatinic acid, hexachloroiridic acid, hexachlororuthenic acid and the like), the latter makes the catalyst strongly acid, and this acidity cannot be easily neutralized, even when using basic compounds. The catalyst has acid properties and the parasitic reactions of cracking, aromatization and isomerization are relatively intense. It is then better to eliminate the introduced chlorine. This elimination may be carried out, for example, by treating with ammonia, washing with an ammonium hydroxide solution or treating with steam.

According to a preferred embodiment the noble metals are introduced before the alkali or alkaline-earth metal compound; when manufactured in the reverse order, the catalysts have lower performances with respect to activity, selectivity and life.

The best catalysts have been manufactured as follows:

1. the alumina carrier is impregnated with an aqueous solution of platinum, iridium and/or ruthenium compounds.

2. It is dried thereafter, for example at a temperature between 60° and 200°C.

3. It is heated up to a temperature of 300° to 600°C, for example for 1 to 5 hours in an air or nitrogen stream.

4. When the impregnation solution contains chlorine, a treatment with an ammonia stream may occur at a temperature between 300° and 600°C.

5. The carrier is then contacted with an aqueous solution of the alkali or alkaline-earth metal compound.

6. The catalyst is dried for example at 60° to 200°C.

7. It is then heated up to about 300° to 600°C in an air stream. The heating time may be, for example, 2 to 4 hours although longer heatings are not detrimental.

8. It is finally reduced with hydrogen, for example at about 350° to 600°C for about 4 to 20 hours with an hourly hydrogen feed rate of about 100 to 1,000 times the volume of catalyst. The latter step is conducted preferably in the dehydrogenation vessel.

The impregnating, drying, heating and reducing steps may be carried out according to well-known techniques and this invention is not limited to the preferred embodiment described herebefore.

The preferred conditions of use of these catalysts are the following: temperatures of 300° to 600°C, preferably 400° to 500°C, absolute pressures of 0.1 to 10 bars and preferably 1 to 4 bars, an hourly feed rate of liquid saturated hydrocarbons of 0.1 to 4 times the catalyst volume, preferably 0.5 to 2 times this volume. The hydrogen partial pressure is of major importance for the stability of the catalysts: the molar ratio of hydrogen to hydrocarbons at the reactor inlet may be 0.1 to 30, for example 2 to 20 and preferably 8 to 15.

The following non-limitative examples are given by way of illustration:

EXAMPLE 1

A $C_{10}$–$C_{14}$ cut of normal paraffins is contacted with a catalyst A comprising platinum and iridium on alpha alumina balls. This catalyst has been manufactured from alpha alumina balls having a specific surface of 10 m2 per gram and a total pore volume of 0.64 ccm per gram (with 79 percent of this pore volume corresponding to pores having an average diameter between 1,000 and 4,000 Angstroms). The neutralization heat by ammonia adsorption of this alpha alumina was zero.

100 g of these balls have been impregnated with 64 ccm of water containing 5.35 ccm of an aqueous solution of hexachloroplatinic acid at 3 percent by weight of platinum and 5,35 ccm of an aqueous solution of iridium chloride containing 0.75 percent by weight of iridium. After 3 hours of contact, the alumina balls have completely absorbed the solution. After 3 hours drying at 100°C in a oven, the balls have been maintained at 400°C for 2 hours and then at 500°C for 2 hours in an air stream. The temperature has been lowered down to 400°C and a nitrogen stream passed therethrough, and then gaseous ammonia at a rate of 20 to 25 liters per hour for 2 hours at 400°C. Nitrogen is passed thereafter at 500°C for 1 hour in order to remove the excess of $NH_3$ adsorbed by the catalyst. After cooling, the catalyst has been impregnated with 61 ccm of an aqueous solution containing 0.5 g of potassium carbonate; after 3 hours of contact, the balls have been dried for 3 hours at 100°C and then heated up to 500°C and maintained for 3 hours at this temperature in an air stream. The thus obtained catalyst contains 0.16 percent by weight of platinum, 0.04 percent by weight iridium and 0.5 percent by weight of potassium as potassium carbonate. It has a specific surface of 9 m2 per gram and a pore volume of 0.6 ccm per gram.

The catalyst has been introduced into the dehydrogenation reactor in which it has been reduced for 8 to 10 hours at 490°–500°C in a hydrogen stream at a rate of 10 to 20 liters per hour.

The $C_{10}$–$C_{14}$ cut has been passed through the catalyst bed at a spatial velocity of 1 liquid volume per volume of catalyst and per hour at 460°C, an absolute pressure of 2 atmospheres and a molar ratio of hydrogen to the $C_{10}$–$C_{14}$ cut of about 10 to 12 at the reactor inlet. The following product has been recovered at the 50th hour of run:

| | |
|---|---|
| n-paraffins: | 88.9 % |
| n-monoolefins: | 10.5 % |
| isoolefins + isoparaffins: | 0.3 % |
| diolefins: | 0.1 % |
| aromatic hydrocarbons: | 0.2 % |

The recovered hydrogen contained small amounts of cracking products such as methane, ethane, propane and butanes; this cracking products amount to 0.1 percent by weight of the starting $C_{10}$–$C_{14}$ cut.

The selectivity to monoolefins, as defined by the ratio:
(weight of n-monoolefins/weight of transformed n-paraffins) × 100 was 93.7 percent.

After 80 hours of run, the temperature was raised to 470°C without change of the other conditions. After 40 hours of run under these new conditions, the product from the reactor had the following composition by weight:

| | |
|---|---|
| n-paraffins: | 83 % |
| n-monoolefins: | 15.8 % |
| isoolefins + isoparaffins: | 0.3 % |
| diolefins: | 0.1 % |
| aromatic hydrocarbons: | 0.8 % |

The cracking products amount to about 0.1 percent by weight of the starting $C_{10}$–$C_{14}$ cut. The selectivity to monoolefins is 92.5 percent.

After 60 hours of run at 470°C, the temperature has been increased to 480°C; after 30 hours in these conditions, the composition by weight of the obtained product was as follows:

| | |
|---|---|
| n-paraffins | : 77.7 % |
| n-monoolefins | : 19.6 % |
| isoolefins+isoparaffins | : 0.5 % |
| diolefins | : 0.1 % |
| aromatic hydrocarbons | : 2.1 % |

The cracking products amounted to about 0.3 percent by weight of the starting $C_{10}$–$C_{14}$ cut.

The selectivity to monoolefins was 86.8 percent.

EXAMPLE 2

Two catalysts, hereinafter referred to as B and C and containing 0.16 percent of platinum, 0.04 percent of iridium and 0.5 percent of potassium as potassium carbonate, have been manufactured according to the process of Example 1.

The carrier of catalyst B was tetragonal gamma alumina with a specific surface of 50 m2 per gram and a total pore volume of 0.6 ccm per gram (82 percent of this volume corresponding to pores having an average diameter between 300 and 1,000 Angstroms). The neutralization heat as determined by ammonia adsorption was 7.5 calories per gram. The final catalyst had a surface of 47 m2 per gram and a pore volume of 0.58 ccm per gram.

The carrier of catalyst C was eta alumina with a specific surface of 230 m2 per gram and a total pore volume of 0.57 ccm per gram (84 percent of this pore volume corresponding to pores of average diameter between 50 and 150 angstroms). The neutralization heat (ammonia adsorption) was 15 calories per gram. The final catalyst had a surface of 220 m2 per gram and a pore volume of 0.55 ccm per gram.

These two B and C catalysts have been tested in the dehydrogenation of the $C_{10}$–$C_{14}$ cut under the experimental conditions of Example 1. The temperature was lowered somewhat so as to obtain a conversion of the same order. The results are given in Table I:

| Catalyst | Reaction Temperature °C | % Conversion rate per run | % Selectivity to n-monoolefins |
|---|---|---|---|
| A | 460 | 11.1 | 93.7 |
| B | 450 | 11.6 | 84.5 |
| C | 445 | 10.9 | 71.3 |

Although catalysts B and C have a high activity, due to their higher specific surface, when compared at substantially equal conversion rate, they have a lower selectivity which may be ascribed to the high acidity of the carriers. This selectivity drop is attributable to the high conversion to aromatic compounds and cracking products.

These results illustrate the effect of the inertness of the carrier: a carrier which is neutral from the beginning is preferred.

EXAMPLE 3

Three catalysts D, E and F containing 0.16 percent of platinum and 0.04 percent of iridium have been manufactured from alpha alumina balls, using the manufacture process of Example 1.

Catalyst D contained no potassium carbonate, and catalysts E and F contained respectively 0.2 and 2 percent by weight of potassium in the form of potassium carbonate. These catalysts have been used under the experimental conditions of Example 1, and their performances compared with those of catalyst A which contained 0.5 percent of potassium.

The results are given in table II.

TABLE II

| Catalyst | Reaction Temperature °C | % Conversion rate per run | % Selectivity to n-monoolefins |
|---|---|---|---|
| D | 460 | 11.2 | 88.8 |
| E | 460 | 11.3 | 92.6 |
| A | 460 | 11.1 | 93.7 |
| F | 465 | 10.8 | 93.9 |

These results show the effect of the basic compounds on the selectivity of the catalyst.

The content of basic compound is preferably about 2 to 4 times the total content of noble metals; below these values, the selectivity decreases substantially; beyond these values, the selectivity no longer increases, and the activity is lowered.

EXAMPLE 4

Three G, H and I catalysts have been manufactured according to the method of Example 1. They contained 0.16 percent platinum 0.04 percent iridium and 0.5 percent potassium as potassium carbonate, the remaining being alpha alumina.

After the introduction of potassium carbonate, the G catalyst was dried at 100°C, but not further heated; catalyst H has been heated for 1 hour at 500°C and catalyst I for 6 hours at 500°C. When tested according to Example 1, they have given the results summarized in Table III.

TABLE III

| Catalyst | Reaction Temperature °C | % Conversion rate per run | % Selectivity to n-monoolefins |
|---|---|---|---|
| G | 470 | 11 | 90.2 |
| H | 465 | 10.9 | 92.5 |
| A | 460 | 11.1 | 93.7 |
| I | 460 | 11.2 | 93.8 |

This table shows the effect of the heating step following depositing the basic compound. The optimal heating time is about 2 to 4 hours; beyond 4 hours, the activity and the selectivity no longer increase substantially.

EXAMPLE 5

Three catalysts referred to as J, K, and L and containing 0.16 percent platinum, 0.04 percent iridium and 0.5 percent potassium carbonate on alpha alumina have been manufactured according to the method of Example 1.

After the first calcination at 400° and 500°C, catalyst J has not been treated with ammonia.

After said first calcination, catalyst K has been treated for 8 hours at 60° to 70°C with a 10 percent aqueous solution of NH$_4$OH. The catalyst was washed several times with water to obtain a negative reaction with silver nitrate and a pH test paper. The catalyst was dried thereafter, contacted with an aqueous solution of potassium carbonate and finally roasted as described in Example 1.

After the first calcination, catalyst L was treated with a stream of steam, for 5 hours at 450°C; it was treated thereafter just as disclosed in Example 1.

These catalysts have been tested as shown in example 1 and compared with catalyst A. The results are summarized in Table IV.

TABLE IV

| Catalyst | Reaction Temperature °C | % Conversion rate per run | % Selectivity to n-monoolefins |
|---|---|---|---|
| J | 460 | 11.4 | 88.3 |
| K | 465 | 11 | 93.2 |
| A | 460 | 11.1 | 93.7 |
| L | 470 | 11.3 | 92.6 |

These results show the effect of removing chlorine from the catalyst.

The best results have been obtained by treating with gaseous ammonia. Washing with aqueous ammonia or treating with steam also give good results; however they slightly reduce the catalyst activity.

EXAMPLE 6

Alpha alumina balls have been used as described in example 1 (ruthenium was used as ruthenium chloride) to manufacture several catalysts having associated therein 2 or 3 noble metals of the platinum group. The catalyst composition and the results are summarized in table V (the operating conditions are those of Example 1).

From these results, it is obvious that the only stable catalysts are the following:
platinum + iridium + ruthenium
platinum + ruthenium
platinum + iridium After 150 hours of run the best conversion rate has been that of the mixture of platinum with both iridium and ruthenium.

| Catalyst | Composition by weight % | Reaction temperature.°C | hours of run | % Conversion rate per run | % Selectivity to n-monoolefins |
|---|---|---|---|---|---|
| M | Platinum: 0.2 K: 0.5 | 470°C | 2 40 150 | 16.1 11.2 7 | 91.5 93 94 |
| A | Platinum: 0.16 Iridium: 0.04 K: 0.5 | 470°C | 2 40 150 | 18.6 17.1 16.2 | 91 92.5 93 |
| N | Platinum:0.16 Ruthenium:0.04 K:0.5 | 470°C | 2 40 150 | 17.9 16.8 16.3 | 90.8 92 92.7 |
| O | Platinum: 0.16 Rhodium: 0.04 K: 0.5 | 470°C | 2 40 150 | 17.8 13.7 8.7 | 91 92.3 93.5 |
| P | Platinum: 0.16 Iridium: 0.02 Ruthenium: 0.02 K: 0.5 | 470°C | 2 40 150 | 18.2 17.5 17.2 | 91.3 92.4 93 |
| Q | Platinum: 0.16 Palladium: 0.04 K: 0.5 | 470°C | 2 40 150 | 15 10.3 4.8 | 91 93 94.5 |
| R | Palladium: 0.2 K: 0.5 | 470°C | 2 40 150 | 14 6.5 3.7 | 92 93.5 94.7 |
| S | Palladium: 0.16 Rhodium: 0.04 K: 0.5 | 470°C | 2 40 150 | 15 10.5 7.7 | 91.5 92.8 11 94 |
| T | Palladium:0.16 Rhodium:0.02 Iridium:0.02 K:0.5 | 470°C | 2 40 150 | 15.2 12.3 9.6 | 91.2 92.4 93.3 |

EXAMPLE 7

Six catalysts, referred to as A$_1$, A$_2$, A$_3$ and N$_1$, N$_2$, N$_3$, have been manufactured from alpha alumina balls according to the technique of Example 1. These catalysts contain 0.5 percent by weight of potassium as K$_2$CO$_3$.

The content of noble metals of these catalysts was the following:

| A$_1$: | platinum : 0.18 %; | iridium: | 0.02 % |
| A$_2$: | platinum : 0.1 %; | iridium: | 0.1 % |
| A$_3$: | Iridium : 0.2 %. | | |
| N$_1$: | Platinum : 0.18 %; | ruthenium: | 0.02 % |
| N$_2$: | Platinum : 0.1 %; | ruthenium: | 0.1 % |
| N$_3$: | Ruthenium: 0.2 %. | | |

These catalysts have been used under the same conditions as described in Example 1 and the results compared with those previously obtained with catalysts M, A and N of Example 6 . The results have been summarized in Table VI.

TABLE VI

| Catalyst | Reaction Temperature | Hours of run | % conversion rate per run | % selectivity to n-monoolefins |
|---|---|---|---|---|

| | | 2 | 16.1 | 91.5 |
|---|---|---|---|---|
| M | 470°C | 40 | 11.2 | 93 |
| | | 150 | 7 | 94 |
| | | 2 | 17.2 | 91.3 |
| $A_1$ | 470°C | 40 | 14.3 | 11 92.8 |
| | | 150 | 10.5 | 93.6 |
| | | 2 | 18.6 | 91 |
| A | 470°C | 40 | 17.1 | 92.5 |
| | | 150 | 16.2 | 93 |
| | | 2 | 18.3 | 89.7 |
| $A_2$ | 470°C | 40 | 16.9 | 91 |
| | 150 | | 15.9 | 91.4 |
| | | 2 | 16.8 | 86.3 |
| $A_3$ | 470°C | 40 | 12.3 | 88.8 |
| | | 150 | 8.2 | 90.5 |
| | | 2 | 17.5 | 91 |
| $N_1$ | 470°C | 40 | 15 | 92.5 |
| | | 150 | 11.6 | 93.2 |
| | | 2 | 17.9 | 90.8 |
| N | 470°C | 40 | 16.8 | 92 |
| | | 150 | 16.3 | 92.7 |
| | | 2 | 17.6 | 87.8 |
| $N_2$ | 470°C | 40 | 16.2 | 89 |
| | | 150 | 15.1 | 90 |
| | | 2 | 16.4 | 83.8 |
| $N_3$ | 470°C | 40 | 12.5 | 85.7 |
| | | 150 | 8.8 | 88 |

These results show that the content of noble metals other than platinum is preferably in the range of 0.15 to 0.3 time the platinum content; below 0.15 time, the stability of the catalyst is only slightly increased, and beyond 0.3 time, the selectivity tends to decrease since cracking products are formed in larger amounts.

Table VI also shows that catalysts based on iridium or ruthenium alone have both a poor stability and a reduced selectivity.

EXAMPLE 8

A catalyst containing 0.32 percent of platinum, 0.04 percent of iridium 0.04 percent of ruthenium and 1 percent of potassium as potassium carbonate has been manufactured from alpha alumina balls according to the process of Example 1.

This catalyst has been used to dehydrogenate a $C_{10}$–$C_{14}$ cut. The hourly liquid feed rate was 1 liter per liter of catalyst, the absolute pressure was three bars, the molar ratio of hydrogen to the feed at the reactor inlet was 10 to 12, and the reaction temperature was 460°C.

The initial conversion rate was 12.4 percent and decreased to 11.7 percent after 200 hours, 11 percent after 800 hours and finally 10.5 percent after 2,400 hours. The corresponding selectivities were 92.8 percent, 93.8 percent, 94.5 and 94.5 percent. These values show the high stability of this catalyst.

After 2,400 hours, the run was stopped and nitrogen was passed for 4 hours through the reactor at 460°C. The catalyst was then treated with a mixture of air with steam (20 percent of air and 80 percent of steam) at 450°C for 5 hours, and then nitrogen was passed therethrough for 2 hours. Then a hydrogen stream was passed therethrough for 10 hours at hourly rate of 50 liters per liter of catalyst to reduce the latter.

The same $C_{10}$–$C_{14}$ cut was passed over the thus reduced catalyst under the same operating conditions as before. The results were substantially the same as those obtained during the first run, which shows that these catalysts may be regenerated easily.

EXAMPLE 9

Catalysts have been manufactured in the same manner as catalyst P of Example 6 except that potassium carbonate was substituted with other basic compounds, the content of alkaline metal or alkaline-earth metal being at each time 0.5 percent by weight.

The noble metals were introduced in the following manner (the contents of these metals were the same as those of catalyst P):

$P_1$: platinum, iridium and ruthenium acetylacetonates $P_2$: citric complexes of platinum, iridium and ruthenium $P_3$, $P_5$ and $P_6$: ammonium hexachloroplatinate, ruthenium chloride and iridium chloride $P_4$: iridium, ruthenium and platinum diaminodinitrites.

The results were the following (reaction temperature: 470°C).

| Catalyst | Basic compound | Hours of run | % conversion rate per run | % selectivity to n-monoolefins |
|---|---|---|---|---|
| $P_1$ | lithium carbonate | 2 | 17.5 | 91.5 |
| | | 150 | 16.3 | 92.5 |
| $P_2$ | calcium acetate | 2 | 17.1 | 91.2 |
| | | 150 | 16.4 | 91.8 |
| $P_3$ | sodium citrate | 2 | 17 | 91 |
| | | 150 | 16.3 | 92.5 |
| $P_4$ | magnesium acetate | 2 | 16.9 | 90.5 |
| | | 150 | 16.5 | 91.5 |
| $P_5$ | barium carbonate | 2 | 16.8 | 90.8 |
| | | 150 | 16.2 | 91.2 |
| $P_6$ | strontium carbonate | 2 | 16.4 | 89.4 |
| | | 150 | 15.9 | 91.4 |

What we claim as our invention is:

1. A substantially neutral catalyst containing (a) alumina, (b) from 0.05 to 2 percent by weight of platinum, (c) from 0.01 to 0.5 percent by weight of at least one additional noble metal from the group consisting of iridium and ruthenium, the latter percentages being given with respect to alumina, wherein the content by weight of the additional noble metal is from 0.05 to 0.3 times the content by weight of platinum and (d) an alkali or alkaline-earth metal with a content by weight of from 2 to 10 times the overall content of noble metals, the specific surface of the catalyst being 1 to 20 sq. m. per gram and the neutralization heat of the alumina being below 5 calories per gram in the ammonia adsorption test.

2. A catalyst as defined by claim 1, said catalyst being produced by impregnating said alumina carrier with said noble metals prior to adding said alkali or alkaline-earth metal compound.

3. A catalyst according to claim 1, wherein the alumina is alpha alumina.

4. A catalyst according to claim 1, the pore volume of which is 0.4 to 0.8 ccm per gram.

5. A catalyst according to claim 4, in which from 70 to 90 percent of the pore volume consists of pores of an average diameter of 1,000 to 4,000 Angstroms.

6. A catalyst according to claim 1, wherein the additional noble metal is iridium.

7. A catalyst according to claim 1, wherein the additional noble metal is ruthenium.

8. A catalyst according to claim 1, wherein the additional noble metal consists of a mixture of iridium and ruthenium in a ratio of 0.1 to 10:1 by weight.

9. A catalyst according to claim 1, wherein the alkali metal compound or alkaline-earth metal compound is an oxide or a hydroxide.

10. A catalyst according to claim 1, wherein the content by weight of the additional noble metal is from 0.05 to 0.6 times the content by weight of platinum.

11. A catalyst according to claim 1, wherein the content by weight of the additional noble metal is from 0.1 to 0.6 times the content by weight of platinum.

12. A catalyst according to claim 1, wherein the content by weight of the additional noble metal is from 0.15 to 0.3 times the content by weight of platinum.

13. A catalyst as defined by claim 1 wherein the neutralization heat of the alumina is below 1.5 calories per gram.

14. A catalyst as defined by claim 1 wherein the content of the alkali or alkaline earth metal (d) is two to four times the total content of the noble metals (b) and (c) on a weight basis.

15. A process for manufacturing a catalyst as defined in claim 1, said process comprising admixing alumina with a platinum compound and at least one compound of a metal selected from the group consisting of iridium and ruthenium, adding a basic compound of a metal selected from the group consisting of alkali metals and alkaline-earth metals and heating the resulting composition up to a temperature of 300° to 750°C with the provision that if at least one of the noble metals is used as a halogen-containing compound, the catalytic composition is contacted with ammonia at 300° to 600°C prior to adding said alkali or alkaline earth metal basic compound.

16. A process according to claim 15, wherein at least one of the noble metals is used as a halogen-containing compound.

17. A process according to claim 15, wherein alumina is contacted with an aqueous solution of platinum and at least one metal selected from the group consisting of iridium and ruthenium, the resulting composition is dried at 60° to 200°C, heated up to a temperature of 300° to 600°C in an air or nitrogen stream, contacted with an aqueous solution of the alkali or alkaline-earth metal compound, dried at 60° to 200°C, heated in air at 350° to 600°C and reduced with hydrogen at 350° to 600°C for 4 to 20 hours at a hydrogen hourly feed rate of 100 to 1,000 times the catalyst volume, said steps being conducted in the above order.

18. A process for dehydrogenating saturated hydrocarbons wherein said hydrocarbons are contacted with a catalyst according to claim 1.

19. The process of claim 18, wherein the catalyst is that of claim 3.

20. The process of claim 18, wherein the catalyst is that of claim 4.

* * * * *